(12) United States Patent
Nagashima et al.

(10) Patent No.: US 8,123,361 B2
(45) Date of Patent: Feb. 28, 2012

(54) DUAL-PROJECTION PROJECTOR AND METHOD FOR PROJECTING IMAGES ON A PLURALITY OF PLANES

(75) Inventors: Kenji Nagashima, Daito (JP); Atsuhiko Chikaoka, Daito (JP); Seiji Takemoto, Daito (JP); Hiroki Matsubara, Daito (JP); Atsuya Hirano, Daito (JP); Hiroshi Nishigaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 515 days.

(21) Appl. No.: 12/263,959

(22) Filed: Nov. 3, 2008

(65) Prior Publication Data

US 2009/0128716 A1 May 21, 2009

(30) Foreign Application Priority Data

Nov. 15, 2007 (JP) ................................. 2007-297021

(51) Int. Cl.
*G03B 21/26* (2006.01)
(52) U.S. Cl. ............................................ 353/30; 353/34
(58) Field of Classification Search .................... 353/28, 353/71, 30, 34; 345/2.2
See application file for complete search history.

(56) References Cited

U.S. PATENT DOCUMENTS

| | | | | |
|---|---|---|---|---|
| 5,568,279 | A * | 10/1996 | Hinman et al. | 358/452 |
| 7,173,605 | B2 | 2/2007 | Fong et al. | |
| 2004/0125147 | A1 | 7/2004 | Liu et al. | |
| 2005/0024324 | A1 | 2/2005 | Tomasi et al. | |
| 2006/0221063 | A1 * | 10/2006 | Ishihara | 345/173 |

FOREIGN PATENT DOCUMENTS

| | | |
|---|---|---|
| JP | 8-76923 | 3/1996 |
| JP | 8-328695 | 12/1996 |
| JP | 2000-66818 | 3/2000 |
| JP | 2000-305706 | 11/2000 |
| JP | 2005-38422 | 2/2005 |
| JP | 2006-295779 | 10/2006 |
| JP | 2006277357 A | 10/2006 |
| JP | 2007-108507 | 4/2007 |

(Continued)

OTHER PUBLICATIONS

Extended European Search Report for Application No. 08019370.9-2224, mailed on Mar. 24, 2009 (8 pages).

(Continued)

*Primary Examiner* — Georgia Y Epps
*Assistant Examiner* — Danell L Owens
(74) *Attorney, Agent, or Firm* — Osha Liang LLP

(57) ABSTRACT

A projector includes: a laser beam generator configured to emit a laser beam according to an image signal; a beam splitter configured to split the laser beam into a first laser beam toward the first projection plane and a second laser beam toward the second projection plane; a scanning unit, disposed between the laser beam generator and the beam splitter, configured to scan the laser beam from the laser beam generator toward the beam splitter; a light receiver configured to receive reflected light of the first laser beam; a computation portion configured to compute positional information indicating a position of an obstacle located in an optical path of the first laser beam based on a light receiving result by the light receiver; and a display control portion configured to change the image signal so that a pointer is displayed in the image based on the positional information.

12 Claims, 17 Drawing Sheets

FOREIGN PATENT DOCUMENTS

| | | | |
|---|---|---|---|
| JP | 2007108570 | A | 4/2007 |
| WO | 2004059560 | A2 | 7/2004 |

OTHER PUBLICATIONS

Patent Abstracts of Japan for Japanese Publication No. 2000-305706, Publication date Nov. 2, 2000 (1 page).
Patent Abstracts of Japan for Japanese Publication No. 2000-066818, Publication date Mar. 3, 2000 (1 page).
Patent Abstracts of Japan for Japanese Publication No. 2007-108507, Publication date Apr. 26, 2007 (1 page).
Patent Abstracts of Japan for Japanese Publication No. 2006-295779, Publication date Oct. 26, 2006 (1 page).
Patent Abstracts of Japan for Japanese Publication No. 2005-038422, Publication date Feb. 10, 2005 (1 page).
Patent Abstracts of Japan for Japanese Publication No. 08-076923, Publication date Mar. 22, 1996 (1 page).
Patent Abstracts of Japan for Japanese Publication No. 08-328695, Publication date Dec. 13, 1996 (1 page).
Office Action for Japanese Patent Application No. 2007-297021 mailed Aug. 30, 2011, with English translation thereof (4 pages).
espacenet, Patent Abstract for Japanese Publication No. 2007108570 Published Apr. 26, 2007 (1 page).
espacenet, Patent Abstract for Japanese Publication No. 2006277357 Published Aug. 12, 2006 (1 page).

* cited by examiner

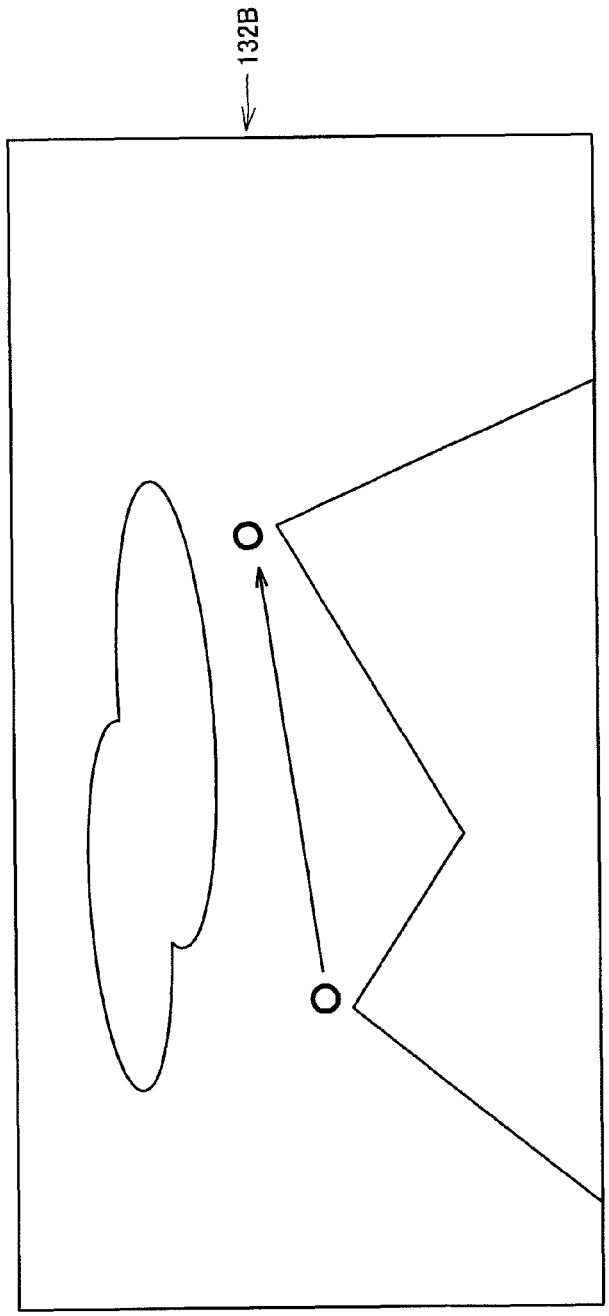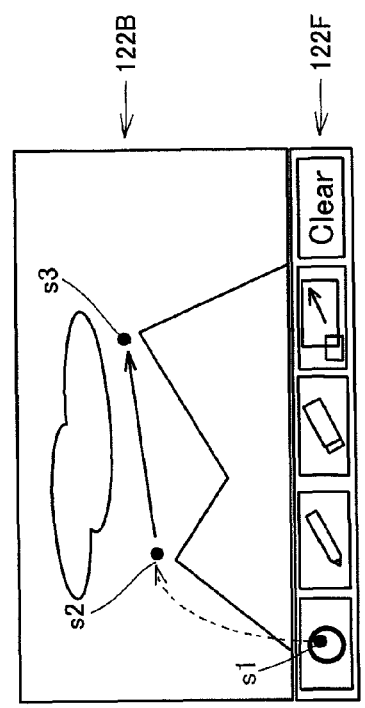
FIG.14A
FIG.14B

DUAL-PROJECTION PROJECTOR AND METHOD FOR PROJECTING IMAGES ON A PLURALITY OF PLANES

BACKGROUND OF THE INVENTION

1. Field of the Invention

The present invention relates to a projector and a method for projecting an image, particularly to a projector that projects an image onto a first and a second projection plane and a method for projecting the image onto the first and second projection plane.

2. Description of the Related Art

A laser projector is well known as a projector that projects an image with a laser beam. In a case of using an apparatus such as the laser projector that projects an image at a position away from the apparatus, a user points a desired point on a screen by using a pointing rod reaching the screen onto which the image is projected from the user position or a laser pointer illuminating the screen with a laser beam. In a case where image data is fed into the projector from another information device, the user points a desired point through an input device such as a touch panel or a mouse which is included in the another information device. Additionally, there is also known another technique of feeding into the projector information on the point desired by the user.

For example, Japanese Patent Laying-Open No. 2000-305706 discloses a data input apparatus including means for deciding data input by detecting an obstacle that temporarily appears in an input area located outside an apparatus body. The data input apparatus includes means for projecting a picture image onto a surface of the input area. A virtual keyboard is projected onto a front surface of the data input device or a surface located in a folding portion of the data input apparatus. An image of the virtual keyboard is produced on the surface using a laser diode and a deflection optics, and the pointer or finger located on the area of the virtual keyboard is accurately detected using an infrared transmission device and an infrared reception device.

Japanese Patent Laying-Open No. 2000-066818 discloses a keyboard terminal that performs key input to an information processing apparatus. The keyboard terminal includes first and second light emitting units that emit light toward each key of a virtual keyboard in which plural keys are arrayed in a virtual manner, a light acceptance unit that accepts light, emitted from each of the first and second light emitting units and reflected from an object located at a position corresponding to each key of the virtual keyboard, and key detection means for detecting which key in the virtual keyboard corresponds to a finger F located at a position based on a signal accepted by the light acceptance unit and performing key input corresponding to the detected key. When the finger is moved to press each key in the virtual keyboard, the light that is emitted from the first and second light emitting units and reflected by the finger is detected, and which key corresponds to the detected light is detected, thereby realizing the key input with the virtual keyboard.

Japanese Patent Laying-Open No. 2007-108507 discloses a projector apparatus including means for splitting the light incident from the projector apparatus with a half-mirror and projecting an image onto a small screen retained by the user near the projector apparatus with the split light and means for accepting user operation in the small screen to transmit the user operation to a personal computer through the projector apparatus.

Japanese Patent Laying-Open No. 2006-295779 discloses a portable information apparatus including a first chassis and a second chassis. The first chassis includes a projection type input display device, a projection type display device, and an input deciding device that detects an obstacle appearing in an input display area. The first information is projected by the projection type input display device and displayed on the projection type input display device. The second chassis is connected to the first chassis in an openable and closable manner. In the portable information apparatus, an input display area where the first information projected by the projection type input display device is displayed and a display area where second information projected by the projection type display device is displayed can be set at an arbitrary position by an opening and closing angle formed between the first chassis and the second chassis.

Japanese Patent Laying-Open No. 2005-038422 discloses a computer device in which a projector projects a user input display projects onto a surface. The projector of the computer device projects a user output display onto a surface. The user input display and the user output display can be projected from the same projector. The user input display and the user output display may be projected onto different surfaces. The single projection image is divided and orientated using a mirror system.

In a projection display apparatus disclosed in Japanese Patent Laying-Open No. 08-076923, a display-integrated tablet is utilized in a transmission type projector, the transmission type projector is disposed such that light emitted from a light source is transmitted through a display surface while an image is displayed in a display area of the display surface, a coordinate position of an input pen point attached to the display-integrated tablet is detected, a processing area is set in the display area such that the input pen can perform the pointing within the processing area, a scattering sheet that scatters part of the light from the light source is disposed immediately below the processing area, the light from the light source is scattered in the processing area at the scattering sheet, and the processing area can visually be recognized from an operator-side position while the processing area is not displayed on the screen.

Japanese Patent Laying-Open No. 08-328695 discloses an electronic instrument provided with a projection display function in which the display screen image and the projection image can be switched or simultaneously displayed by a display switching key. The projection image can be displayed while a display unit is detached so as not to block the projection image.

However, in the conventional techniques, in order that the user points the desired point in the projected image, it is necessary to provide a complicated, expensive virtual touch sensor in the projector or to prepare another device, that is, the laser pointer or another information device in addition to the projector.

SUMMARY OF THE INVENTION

In view of the above problem, a main object of the present invention is to provide a projector including a simple virtual touch sensor.

In accordance with a first aspect of the present invention, there is provided a projector for projecting an image onto a first and a second projection plane. The projector includes: a laser beam generator configured to emit a laser beam according to an image signal; a beam splitter configured to split the laser beam into a first laser beam toward the first projection plane and a second laser beam toward the second projection plane; a scanning unit, disposed between the laser beam generator and the beam splitter, configured to scan the laser beam from the laser beam generator toward the beam splitter; a light receiver configured to receive reflected light of the first laser beam; a computation portion configured to compute positional information indicating a position of an obstacle located in an optical path of the first laser beam based on a light receiving result by the light receiver; and a display control portion configured to change the image signal so that a pointer is displayed in the image based on the positional information.

The image preferably includes a first image and a second image. The beam splitter is disposed in a part corresponding to the first image in an optical path of the laser beam scanned by the scanning unit. The first laser beam projects the first and second images onto the first projection plane. The second laser beam projects the first image onto the second projection plane.

The image signal preferably includes a vertical synchronizing signal. The light receiver obtains a two-dimensional incident direction of the reflected light. The computation portion computes the positional information based on the two-dimensional incident direction and the vertical synchronizing signal.

The image signal preferably includes a vertical synchronizing signal and a horizontal synchronizing signal. The light receiver obtains a one-dimensional incident direction of the reflected light. The computation portion computes the positional information based on the one-dimensional incident direction, the vertical synchronizing signal, and the horizontal synchronizing signal.

In accordance with a second aspect of the present invention, there is provided a projector for projecting an image onto a first and a second projection plane. The projector includes: a laser beam generator configured to emit a laser beam according to an image signal; a beam splitter configured to split the laser beam into a first laser beam toward the first projection plane and a second laser beam toward the second projection plane; a scanning unit, disposed between the laser beam generator and the beam splitter, configured to scan the laser beam from the laser beam generator toward the beam splitter; a light receiver configured to receive reflected light of the first laser beam; a computation portion configured to compute positional information indicating a position of an obstacle located in an optical path of the first laser beam and change information indicating a change in position of the obstacle based on a light receiving result by the light receiver; and a production portion configured to produce an operation command to the projector based on the positional information and the change information.

The image preferably includes a first image and a second image. The beam splitter is disposed in a part corresponding to the first image in an optical path of the laser beam scanned by the scanning unit. The first laser beam projects the first and second images onto the first projection plane. The second laser beam projects the first image onto the second projection plane.

The image signal preferably includes a vertical synchronizing signal. The light receiver obtains a two-dimensional incident direction of the reflected light. The computation portion computes the positional information based on the two-dimensional incident direction and the vertical synchronizing signal.

The image signal preferably includes a vertical synchronizing signal and a horizontal synchronizing signal. The light receiver obtains a one-dimensional incident direction of the reflected light. The computation portion computes the positional information based on the one-dimensional incident direction, the vertical synchronizing signal, and the horizontal synchronizing signal.

In accordance with a third aspect of the present invention, there is provided a method for projecting an image onto a first and a second projection plane. The method for projecting an image includes the steps of: emitting a laser beam according to an image signal; scanning the laser beam; splitting the scanned laser beam into a first laser beam toward the first projection plane and a second laser beam toward the second projection plane; receiving reflected light of the first laser beam; computing positional information indicating a position of an obstacle located in an optical path of the first laser beam based on a result of receiving the reflected light; and changing the image signal so that a pointer is displayed in the image based on the positional information.

The image preferably includes a first image and a second image. The step of splitting the scanned laser beam includes the step of splitting the scanned laser beam into the first laser beam corresponding to the first and second images and the second laser beam corresponding to the first image. The method for projecting an image further includes the steps of: projecting the first and second images onto the first projection plane with the first laser beam; and projecting the first image onto the second projection plane with the second laser beam.

The image signal preferably includes a vertical synchronizing signal. The step of receiving reflected light includes the step of obtaining a two-dimensional incident direction of the reflected light. The step of computing positional information includes the step of computing the positional information based on the two-dimensional incident direction and the vertical synchronizing signal.

The image signal preferably includes a vertical synchronizing signal and a horizontal synchronizing signal. The step of receiving reflected light includes the step of obtaining a one-dimensional incident direction of the reflected light. The step of computing positional information includes the step of computing the positional information based on the one-dimensional incident direction, the vertical synchronizing signal, and the horizontal synchronizing signal.

Thus, the present invention can provide the projector including the simple virtual touch sensor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14A is a first schematic diagram showing a state where an image plane of an image editing application is projected onto a screen, and FIG. 14B is a first schematic diagram showing a state where the image plane of the image editing application is displayed on the table.

DESCRIPTION OF THE PREFERRED EMBODIMENTS

An embodiment of the present invention will be described below with reference to the drawings. In the following description, the same component is designated by the same symbol. The same holds true for a name and a function of the component. Accordingly, detailed description thereof is not repeated.

(Use Mode)

Figure 1:
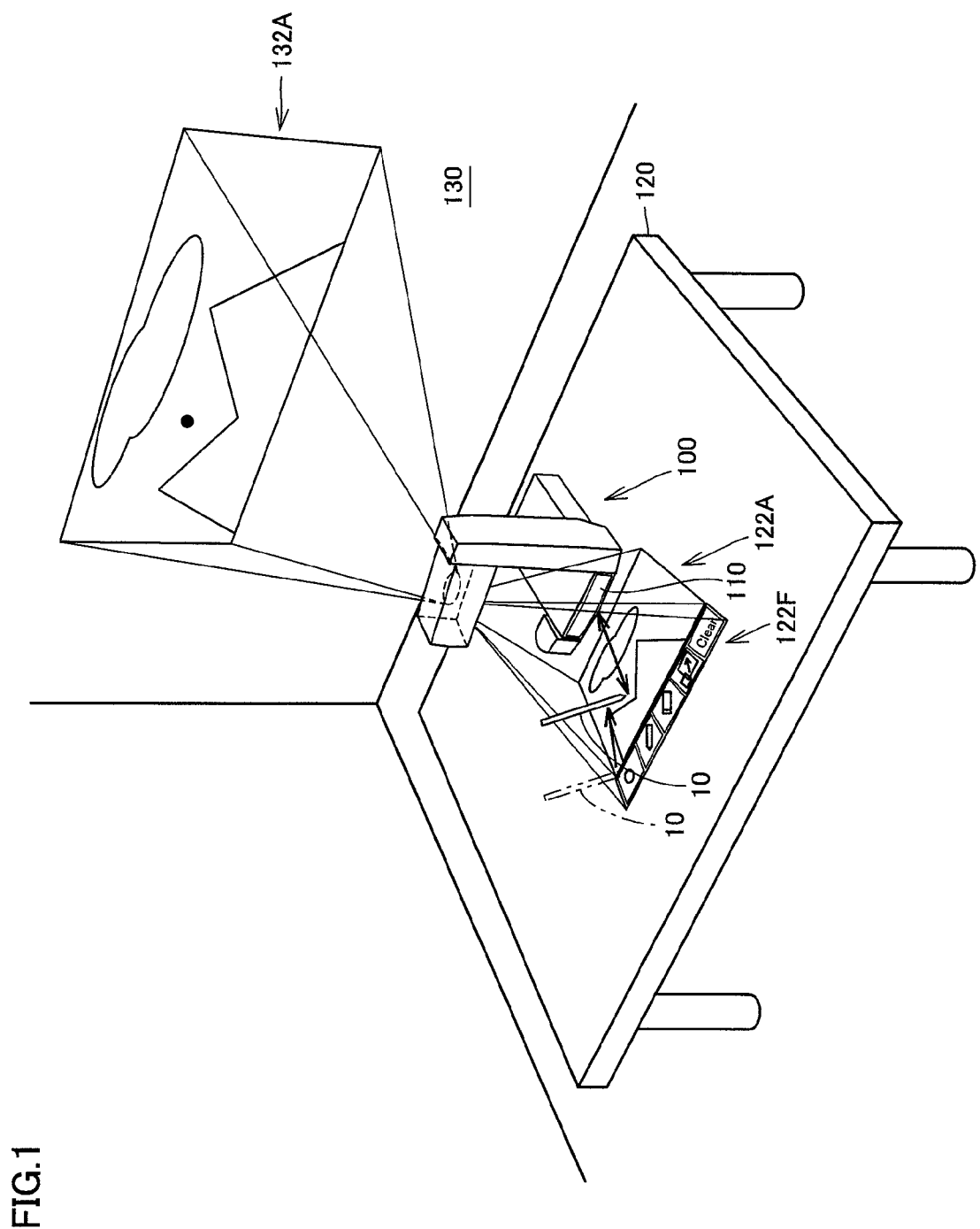
FIG. 1 is a schematic diagram showing a state where a laser projector according to an embodiment of the present invention is placed on a table.

Referring to FIG. 1, a use mode of a projector according to an embodiment of the present invention will be described. FIG. 1 is a schematic diagram showing a state where a laser projector 100 of the embodiment is placed on a table 120. Projector 100 may be a mobile type projector having a portable size or a fixed type projector.

For example, projector 100 is used while placed on a table 120. Projector 100 projects a presentation (display) image 132A toward a screen 130 (for example, vertical wall). Projector 100 also projects an input image 122A similar to presentation image 132A toward an upper surface of table 120 such that a user of projector 100 can refer to image 132A. A size of image 122A is usually smaller than that of image 132A.

Figure 7:
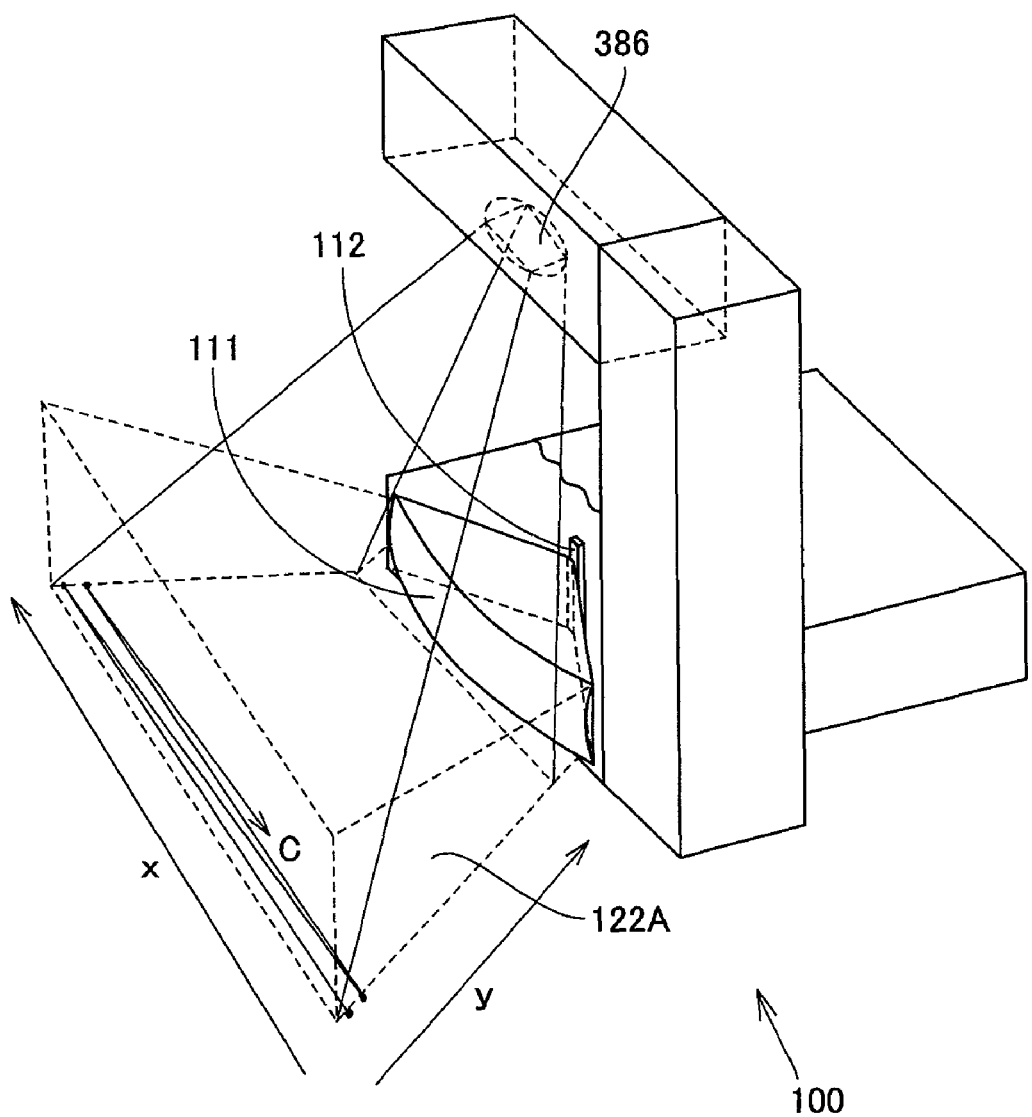
FIG. 7 is a schematic diagram showing an optical system of a virtual touch panel functioning as an input interface unit in a state where there exists no external obstacle.

Projector 100 includes a CCD (Charge Coupled Device) sensor 110. Alternatively, projector 100 includes a free-form surface lens 111 and a one-dimensional CMOS (Complementary Metal Oxide Semiconductor) array sensor 112 as shown in FIG. 7. More particularly, in projector 100, input image 122A to which the user refers includes an image 122F such as an icon with which the used edits the image.

(Hardware Configuration)

Figure 2:
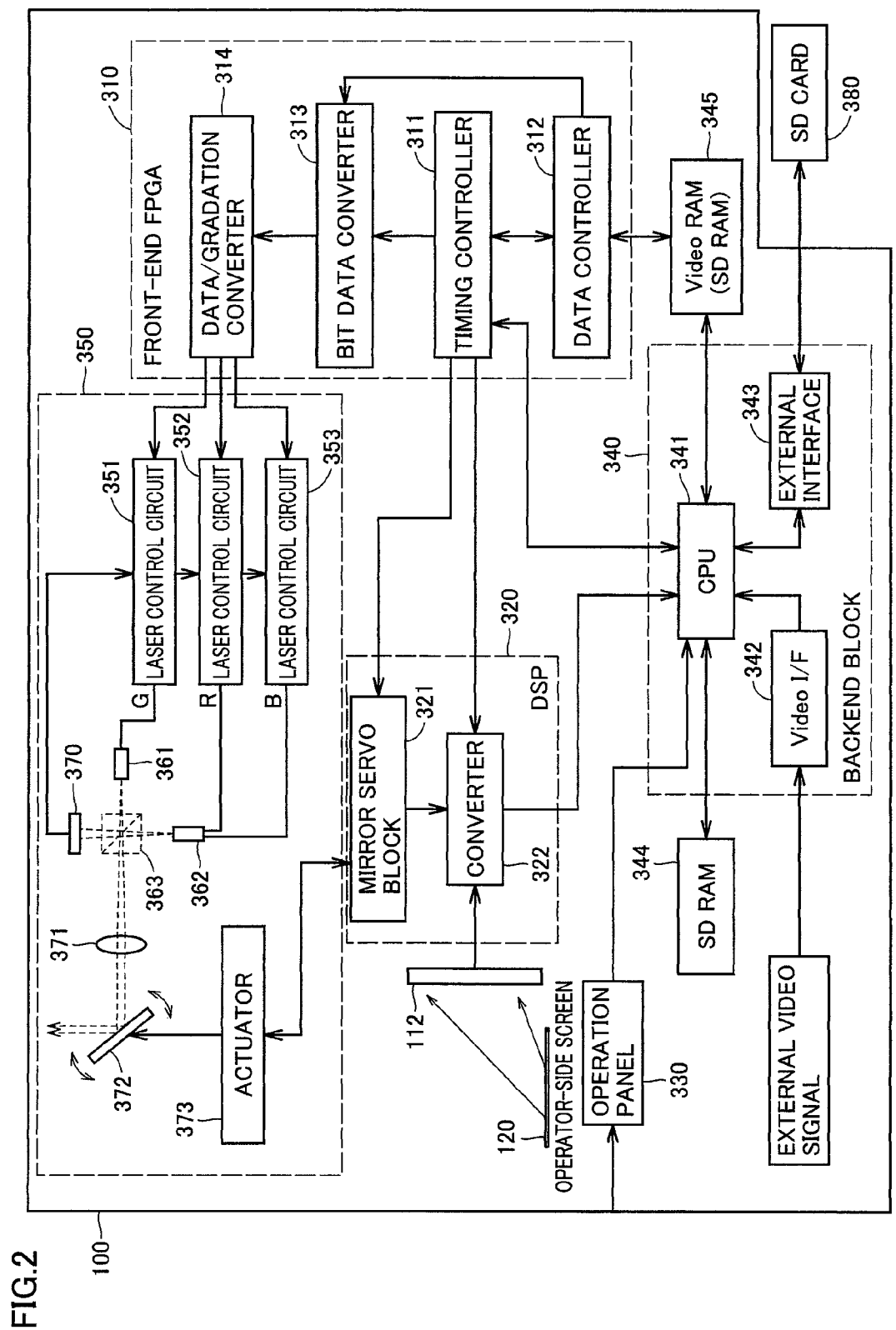
FIG. 2 is a block diagram showing a hardware configuration of the laser projector.

Referring to FIG. 2, a specific configuration of laser projector 100 will be described below. FIG. 2 is a block diagram showing a hardware configuration of laser projector 100.

Projector 100 includes a front-end FPGA (Field Programmable Gate Array) 310, a digital signal processor 320, an operation panel 330, a backend block 340, a SDRAM (Synchronous Dynamic Random Access Memory) 344, a video RAM 345, and a three-wavelength laser beam generator 350.

Front-end FPGA 310 includes a data/gradation converter 314, a timing controller 311, a data controller 312, and a bit data converter 313. Digital signal processor 320 includes a mirror servo block 321 and a converter 322.

Three-wavelength laser beam generator 350 is an optical system that includes laser control circuits 351, 352, and 353, a green LD (Laser Diode) 361, a red and blue LD 362, a polarization beam splitter 363, a detector 370, a galvanic mirror 372, and an actuator 373. Although red and blue LD 362 of the embodiment is integrally formed by a red LD and a blue LD, red and blue LD 362 may individually be formed.

Operation panel 330 is provided in a surface of side face of a chassis of projector 100. Operation panel 330 includes a display device (not shown) that displays operation contents and a switch (for example, +/−button) that accepts input operation to projector 100. When accepting the operation, operation panel 330 transmits a signal to CPU 341 of backend block 340 in response to the operation.

An image signal imparted from the outside of projector 100 is fed into a video interface 342. In an aspect, projector 100 includes an external interface 343. SD card 380 is inserted in external interface 343. External interface 343 reads data from SD card 380, and the data is stored in SDRAM 344 or video RAM 345.

CPU 341 controls video projection of the signal fed into projector 100 through external interface 343 based on the input operation imparted to operation panel 330. More particularly, CPU 341 conducts mutual communication with timing controller 311 of front-end FPGA 310, thereby controlling the video display based on image data tentatively retained in video RAM 345.

In front-end FPGA 310, timing controller 311 reads the data retained in video RAM 345 through data controller 312 based on an instruction provided from CPU 341. Data controller 312 transmits the read data to bit data converter 313. Bit data converter 313 transmits the data to data/gradation converter 314 based on a command issued from timing controller 311. Bit data converter 313 converts the image data imparted from the outside into data suitable to the format laser beam emission projection.

Data/gradation converter 314 converts data supplied from bit data converter 313 into color gradation data in order to display three-color data of G (green), R (Red), and B (Blue), and data/gradation converter 314 transmits the converted data to laser control circuits 351, 352, and 353.

On the other hand, timing controller 311 controls drive of two-axis galvanic mirror 372 along with digital signal processor 320. More specifically timing controller 311 issues a command to mirror servo block 321 to drive actuator 373. Actuator 373 changes a position and inclination of two-axis galvanic mirror 372 according to the command. That is, timing controller 311 transmits a signal to actuator 373 through mirror servo block 321, and actuator 373 changes a direction of galvanic mirror 372 based on the signal, whereby three-wavelength laser beam generator 350 performs the scanning with the three-wavelength laser beam.

Converter 322 performs A/D (Analog to Digital) conversion of the signal transmitted from CCD sensor 110 (or one-dimensional CMOS array sensor 112) based on the signal transmitted from timing controller 311, and converter 322 transmits the converted digital data to CPU 341. For example, when CCD sensor 110 photographs a subject located within a shooting range, the image signal of the subject is transmitted to CPU 341. When a setting for displaying the image photographed by CCD sensor 110 is available, CPU 341 issues the command to display the image based on the data to timing controller 311.

Converter 322 transmits the signal supplied from mirror servo block 321 to CPU 341. For example, converter 322 produces a signal including the command issued to actuator 373 and a state of actuator 373, and converter 322 transmits the signal to CPU 341.

Laser control circuit 351 controls drive of green LD 361 based on the signal supplied from the data/gradation converter 314. Similarly laser control circuit 352 and 353 control red LD and blue LD according to the command supplied from data/gradation converter 314. Green LD 361 and red and blue LD 362 emit the laser beams according to the control.

Polarization beam splitter 363 is disposed in an optical path of the laser beam emitted from green LD 361. Polarization beam splitter 363 transmits the laser beam emitted from green LD 361. Polarization beam splitter 363 partially transmits and partially reflects the laser beam emitted from red and blue LD 362. Detector 370 is disposed in the optical path of each laser beams emitted from the red and blue LD 362. Each laser beam passing through polarization beam splitter 363 is collected within a predetermined range through a lens 371 and reflected by two-axis galvanic mirror 372. The reflected light is projected toward the outside of projector 100. At this point, the inclination of two-axis galvanic mirror 372 is changed by the drive of actuator 373, whereby the outside is illuminated with the reflected light from the three-wavelength laser beam generator 350 while scanned with the reflected light. That is, an orientation of two-axis galvanic mirror 372 is changed, whereby the outside is illuminated with the laser beam while scanned with laser beam.

Figure 3:
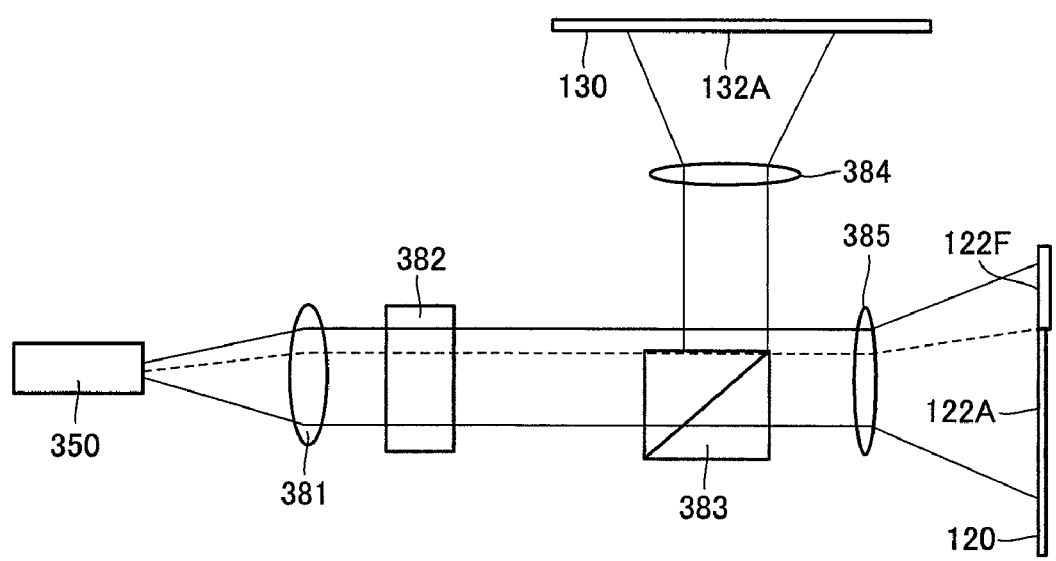
FIG. 3 is a schematic diagram showing a three-wavelength laser beam optical system after light is reflected by a galvanic mirror.

Referring to FIG. 3, the three-wavelength laser beam optical system after the light is reflected from galvanic mirror 372 will be described. FIG. 3 is a schematic diagram showing an optical system of a three-wavelength laser beam A after the light is reflected by galvanic mirror 372. The three-wavelength laser beams with which the outside is illuminated while scanned by galvanic mirror 372 in three-wavelength laser beam generator 350 passes through a collimate lens 381 to become parallel light. Then the three-wavelength laser beam is modulated by a spatial light modulator 382 and a beam splitter 383 is illuminated with the modulated three-wavelength laser beam.

Beam splitter 383 is disposed in a part of the optical path of the three-wavelength laser beam. Therefore, in the three-wavelength laser beam, only the laser beam with which beam splitter 383 is illuminated is reflected (deflected) by beam splitter 383 and projected toward a direction of screen 130. In the three-wavelength laser beam, the laser beam passing through the optical path where beam splitter 383 is not disposed is not reflected (deflected) by beam splitter 383 and projected toward a direction of table 120.

That is, beam splitter 383 reflects only part of the laser beam transmitted through spatial light modulator 382, thereby splitting the laser beam transmitted through spatial light modulator 382. The part of the laser beam is used to form a presentation image 132A. In other words, CPU 341 controls front-end FPGA 310 and three-wavelength laser beam generator 350 such that only an area which should be projected as presentation image 132A to screen 130 is reflected by beam splitter 383 the whole laser beam.

A magnifying lens 384 is disposed on a downstream side in the direction of screen 130 of beam splitter 383 in order that screen 130 is illuminated with the three-wavelength laser beam while the three-wavelength laser beam is diffused. On the other hand, a magnifying lens 385 is disposed on the downstream side in the direction of screen 130 of beam splitter 383 in order that table 120 is illuminated with the three-wavelength laser beam while the three-wavelength laser beam is diffused. Therefore, the part of the laser beam, which is emitted from three-wavelength laser beam generator 350 and split by the reflection from beam splitter 383, passes through magnifying lens 384. The part of the laser beam emitted from three-wavelength laser beam generator 350 is incident from projector 100 to screen 130.

On the other hand, the three-wavelength laser beam transmitted through beam splitter 383 passes through magnifying lens 385 along with the three-wavelength laser beam that is not transmitted through beam splitter 383, and the three-wavelength laser beam that is transmitted through beam splitter 383 and the three-wavelength laser beam that is not transmitted through beam splitter 383 pass through a mirror (not shown) and a lens (for example, lens 386 in FIGS. 5 and 7) to project the image onto table 120. The three-wavelength laser beam that is transmitted through beam splitter 383 and the three-wavelength laser beam that is not transmitted through beam splitter 383 are used to display image 122A to which the user refers. The three-wavelength laser beam that is transmitted through beam splitter 383 is used to form the image similar to image 132A projected onto screen 130.

On the other hand, the three-wavelength laser beam that is not transmitted through beam splitter 383 is used to form the image that is not expressed in presentation image 132A projected onto screen 130, and the three-wavelength laser beam that is not transmitted through beam splitter 383 is used to form a dedicated image 122F with which the user edits the image or document. Dedicated image 122F to which the user refers includes a comment relating to image 132A projected onto current screen 130. Therefore, when image 132A is displayed on screen 130, only the user can refer to dedicated image 122F on table 120. That is, even if the user forgets comments to be spoken when image 132A is displayed on screen 130, the user can advance the presentation by referring to dedicated image 122F on table 120.

(Functional Configuration)

Figure 4:
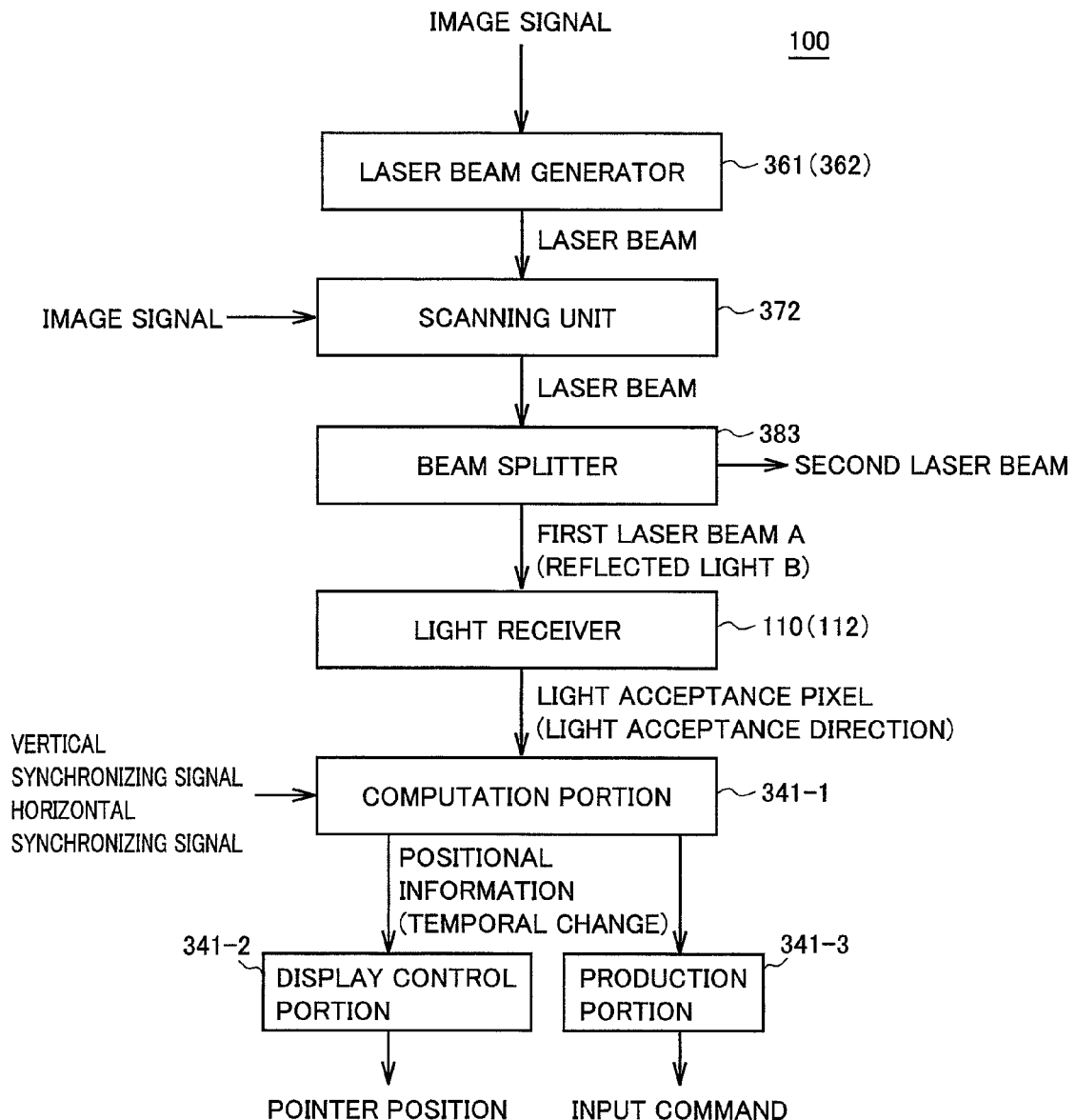
FIG. 4 is a block diagram showing a configuration of a function included in the projector.

Referring to FIG. 4, a functional configuration of projector 100 will be described. FIG. 4 is a block diagram showing the configuration of the function included in projector 100. Projector 100 includes laser beam generator (361 and 362), scanning unit (372), a beam splitter 383, light receiver (110 and 112), computation portion (341-1), display control portion (341-2), and production portion (341-3).

For example, the laser beam generator is realized by green LD 361 and red and blue LD 362. The laser beam generator emits the laser beam toward a scanning unit according to an image signal fed into CPU 341 and an image signal supplied from CPU 341. The image projected with the laser beam includes a first image and a second image. That is, the image signal supplied from CPU 341 includes a first image signal corresponding to the first image and a second image signal corresponding to the second image.

As described later, the first image is projected onto screen 130 and table 120. On the other hand, the second image is projected only to table 120. That is, participants of the presentation can browse only the first image. On the other hand, the user (operator) of projector 100 can browse both the first image and the second image. For example, the second image is an image used to operate projector 100 or an image used to indicate contents (comment) that should be described during the display of the first image.

For example, the scanning unit is realized by galvanic mirror 372. The scanning unit scans the three-wavelength laser beam to illuminate beam splitter 383 with the three-wavelength laser beam.

Beam splitter 383 supplies the scanned laser beam while the laser beam is divided into a first direction and a second direction. Particularly, beam splitter 383 is disposed in part of the optical path of the scanned laser beam, and beam splitter 383 supplies only the laser beam corresponding to the first image signal while the laser beam is divided into the first direction and the second direction. In other words, beam splitter 383 supplies the whole (portion corresponding to the first and second images) of the three-wavelength laser beam in the form of a first laser beam A to the first direction, and beam splitter 383 supplies part (portion corresponding to the first image) of the three-wavelength laser beam in the form of a first laser beam to the second direction. That is, beam splitter 383 supplies part of the three-wavelength laser beam to the first and second directions. The remaining of the three-wavelength laser is supplied only to the first direction.

The light receiver is realized by CCD sensor 110 or one-dimensional CMOS array sensor 112. The light receiver accepts reflected light B reflected by an external obstacle 10 in first laser beam A projected to the first direction. More particularly, for example, the light receiver realized by CCD sensor 110 obtains a horizontal-direction component and a vertical-direction component at a light acceptance position (light acceptance direction) of the reflected light B accepted. Alternatively, the light receiver realized by one-dimensional CMOS array sensor 112 obtains a vertical-direction component (light acceptance height) at the light acceptance position (light acceptance direction) of the reflected light B accepted.

A computation portion 341-1, a display control portion 341-2, and a production portion 341-3 are realized such that CPU 341 reads a control program stored in SDRAM 344 to execute the program.

Computation portion 341-1 computes positional information on external obstacle 10 based on reflected light B accepted by the light receiver. Computation portion 341-1 also computes change information indicating a change in position of external obstacle 10 based on accepted reflected light B. More particularly computation portion 341-1 computes a position (coordinate) at which directions (incident vector and outgoing vector) intersect each other from an incident direction (incident vector) in which reflected light B is incident to the light receiver and an outgoing direction (outgoing vector) of three-wavelength laser beam A, and computation portion 341-1 recognizes that external obstacle 10 exists at the position (coordinate). Computation portion 341-1 computes a position (coordinate) of a lowest end of external obstacle 10, and computation portion 341-1 recognizes a temporal change in position (coordinate) of the lowest end (for example, moving direction or moving speed of the position of the lowest end).

More particularly computation portion 341-1 computes the positional information on external obstacle 10 based on the horizontal-direction component and vertical-direction component at the light acceptance position (light acceptance direction) of the reflected light B transmitted from CCD sensor 110 and the vertical synchronizing signal of first laser beam A corresponding to reflected light B. That is, computation portion 341-1 obtains the vertical synchronizing signal to confirm the height of the outgoing light (first laser beam A), so that computation portion 341-1 can recognize the horizontal-direction position (coordinate) corresponding to the height in the path (vector) of the reflected light B as a surface of external obstacle 10.

Alternatively, computation portion 341-1 computes the positional information on external obstacle 10 based on the vertical-direction component in the light acceptance direction (light acceptance position) of reflected light B transmitted from one-dimensional CMOS array sensor 112 and the vertical synchronizing signal and horizontal synchronizing signal of first laser beam A corresponding to reflected light B. That is, computation portion 341-1 obtains the vertical synchronizing signal and horizontal synchronizing signal to confirm the direction of the outgoing light (first laser beam A), so that computation portion 341-1 can recognize the position corresponding to the vertical direction component of the light acceptance direction of reflected light B in the path (vector) of the outgoing light (first laser beam A) as the surface of external obstacle 10. Computation portion 341-1 also computes the change information indicating the change in position of external obstacle 10 based on the change of the positional information.

Display control portion 341-2 displays a pointer at a position corresponding to the position of external obstacle 10 in the second image expressed by the second laser beam projected in the second direction using the laser beam generator and the scanning unit based on the computed positional information.

Production portion 341-3 produces an input command to the projector (CPU 342) based on the positional information indicating the position (of the lower end) of external obstacle 10 computed by computation portion 341-2 and the change information indicating the change in position (of the lower end) of external obstacle 10 computed by computation portion 341-2. For example, based on the positional information and change information computed by computation portion 341-1, production portion 341-3 recognizes that external obstacle 10 is lifted again (separated from part of dedicated image 122F) after touching part of dedicated image 122F projected onto table 120. Then, based on the recognition result, production portion 341-1 produces a command (for example, icon selection command) corresponding to such behavior of external obstacle 10, and production portion 341-1 transmits the command to another application.

(Position Specifying Method)

Referring to FIGS. 1 and 2, processing for specifying a position of external obstacle 10 performed by projector 100 will be described below. The laser beam emitted from three-wavelength laser beam generator 350 corresponds to one pixel. Actuator 373 and galvanic mirror 372 perform high-speed scanning of the laser beam (scan the image plane) in the horizontal direction and the vertical direction, thereby forming the image on screen 130 and table 120.

CCD sensor 110 is provided in a rear face in a lower portion of projector 100. CCD sensor 110 supplies the signal, produced by the light acceptance element based on accepted reflected light B, to converter 322. Converter 322 performs A/D conversion of the signal to supply the digital signal to CPU 341. This enables projector 100 to detect external obstacle 10 entering user-side image 122A. More particularly projector 100 can detect the position of external obstacle 10 entering the optical path of three-wavelength laser beam A (first laser beam A) used to form image 122A.

Figure 5:
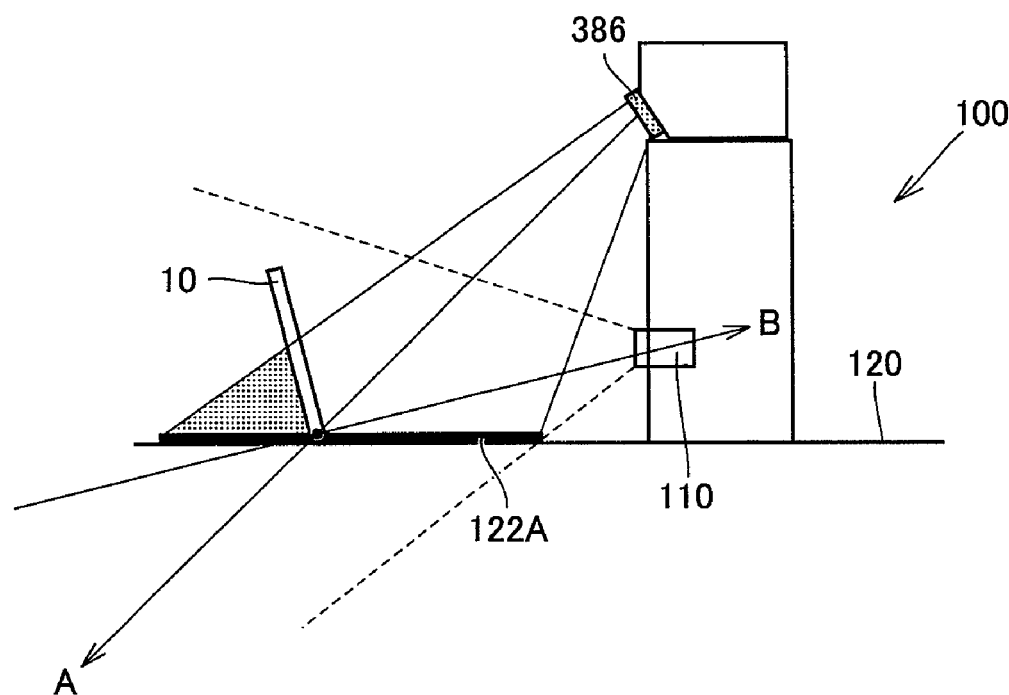
FIG. 5 is a schematic diagram showing a laser beam emitted from the projector and reflected light accepted by a CCD sensor.
Figure 6:
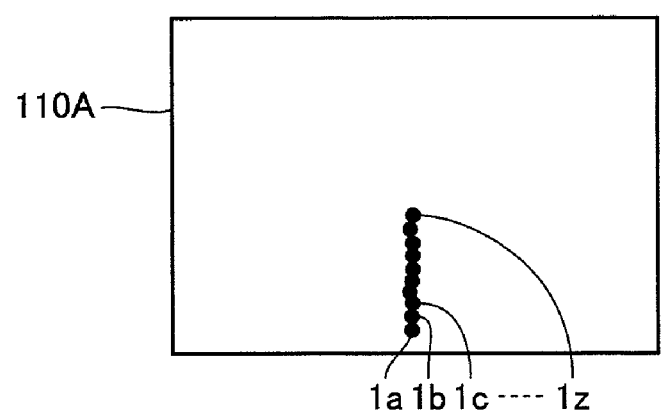
FIG. 6 is a schematic diagram showing a light acceptance pixel of the reflected light accepted by the CCD sensor.

FIG. 5 is a schematic diagram showing first laser beam A emitted from projector 100 and reflected light B accepted by CCD sensor 110. FIG. 6 is a schematic diagram showing a light acceptance pixel of reflected light B accepted by CCD sensor 110. As shown in FIGS. 5 and 6, for example, it is assumed that CCD sensor 110 accepts reflected light B by light acceptance pixels 1a to 1z. At this point, CCD sensor 110 performs sensing in synchronization with the three-wavelength laser beam used to form image 132A projected onto screen 130, whereby projector 100 can recognize which position of image 122A three-wavelength laser beam A corresponds to with respect to reflected light B accepted by the light acceptance pixel 1a.

Thus, CPU 341 can compute the positional information (three-dimensional coordinate) on the intersection point of three-wavelength laser beam A and reflected light B from the light acceptance position of reflected light B obtained by CCD sensor 110 and the emission direction of three-wavelength laser beam A corresponding to reflected light B. This enables CPU 341 to compute the height of the lowest point of external obstacle 10 from a reference plane (for example, table 120). CPU 341 can also recognize whether a pen point of external obstacle 10 held by the user touches image 122A displayed on table 120 or exists in air.

In a case where CPU 341 can obtain the horizontal synchronizing signal of three-wavelength laser beam A, CPU 341 can also compute the position in the horizontal direction of external obstacle 10. In such cases, CCD sensor 110 may be one-dimensional CMOS array sensor 112. A configuration in which CPU 341 computes the positional information indicating the position of external obstacle 10 and the change information indicating the motion (temporal change) based on the signal that is obtained from one-dimensional CMOS array sensor 112 by obtaining the horizontal synchronizing signal will be described below.

FIG. 7 is a schematic diagram showing an optical system of a virtual touch panel functioning as an input interface unit in a state where there exists no external obstacle 10. As shown in FIG. 7, laser projector 100 forms image 122A on the operator-side screen (on table 120) by scanning three-wavelength laser beam A in an x-direction and a y-direction like presentation screen 130. Reflected light B corresponding to each pixel of first laser beam A with which the operator screen is illuminated is accepted by one-dimensional CMOS array sensor 112 through free-form surface lens 111.

Figure 8:
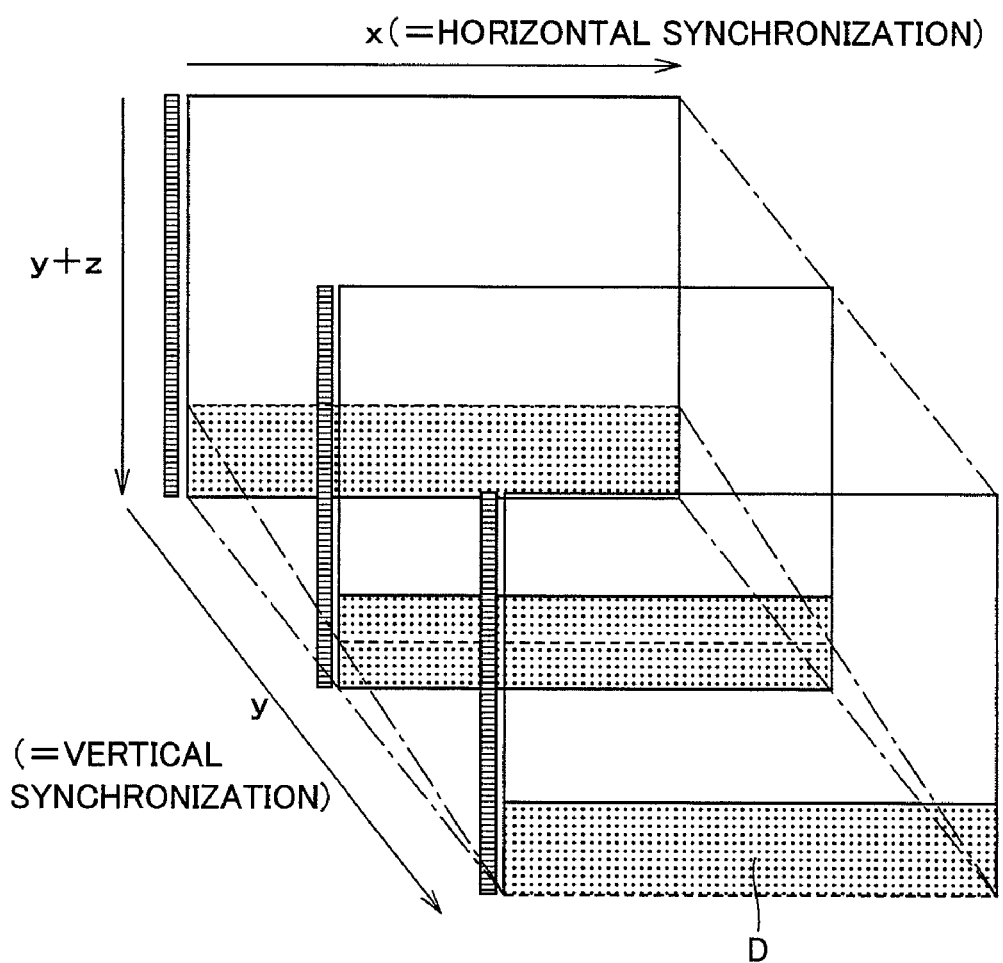
FIG. 8 is a schematic diagram showing a time sequence of light detected by a one-dimensional CMOS array sensor in a state where there exists no external obstacle.

FIG. 8 is a schematic diagram showing a time sequence of light (reflected light B) detected by one-dimensional CMOS array sensor 112 in a state where there exists no external obstacle 10. Referring to FIG. 8, one of planes formed between the x-direction and (y+z)-direction indicates data obtained in a case where one-dimensional CMOS array sensor 112 performs one-line scanning in the horizontal direction (x-axis direction). CPU 341 sequentially reads the data through one-dimensional CMOS array sensor 112 to obtain one-frame image data shown in FIG. 8. In FIG. 8, a dotted-display area indicates a range where one-dimensional CMOS array sensor 112 can obtain reflected light B as screen image detection data. That is, array sensor CMOS one-dimensional 112 detects the data line by line as the data in the y-direction, whereby CPU 341 obtains the one-frame image data.

Figure 9:
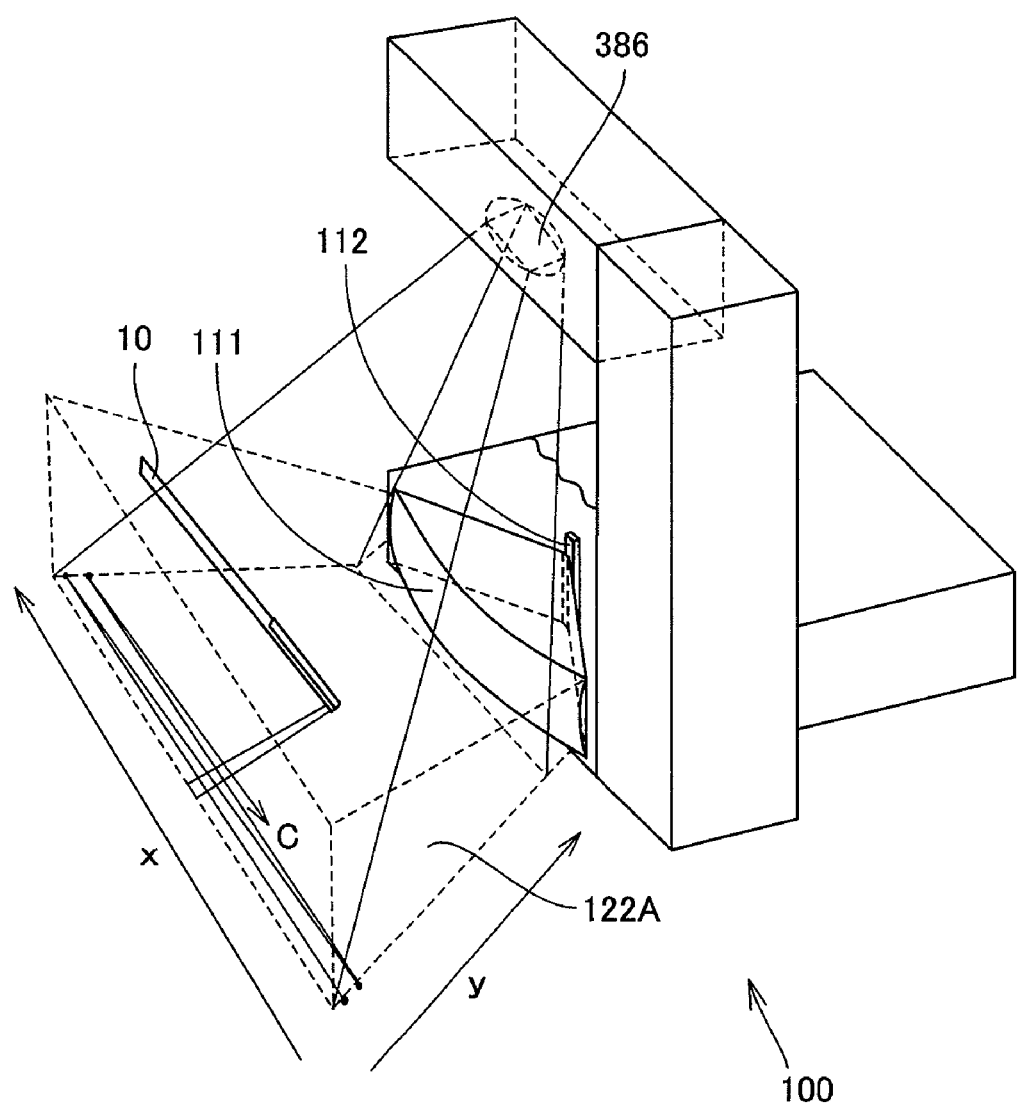
FIG. 9 is a schematic diagram showing the virtual touch panel functioning as the input interface unit in a state where the external obstacle is located in a reference plane.

FIG. 9 is a schematic diagram showing the virtual touch panel functioning as the input interface unit in a state where external obstacle 10 is located in the reference plane (surface of table 120). That is, FIG. 9 shows a case where the user inserts external obstacle 10 (in this case, rod-shape pen) in the projection optical path of three-wavelength laser beam A while external obstacle 10 touches the surface of table 120. As shown in FIG. 9, part of the image (three-wavelength laser beam A) projected to external obstacle 10 is reflected from the surface of external obstacle 10, and reflected light B is accepted by one-dimensional CMOS array sensor 112 through free-form surface lens 111. At this point, FIG. 10 shows the reflected light B accepted by one-dimensional CMOS array sensor 112.

Figure 10:
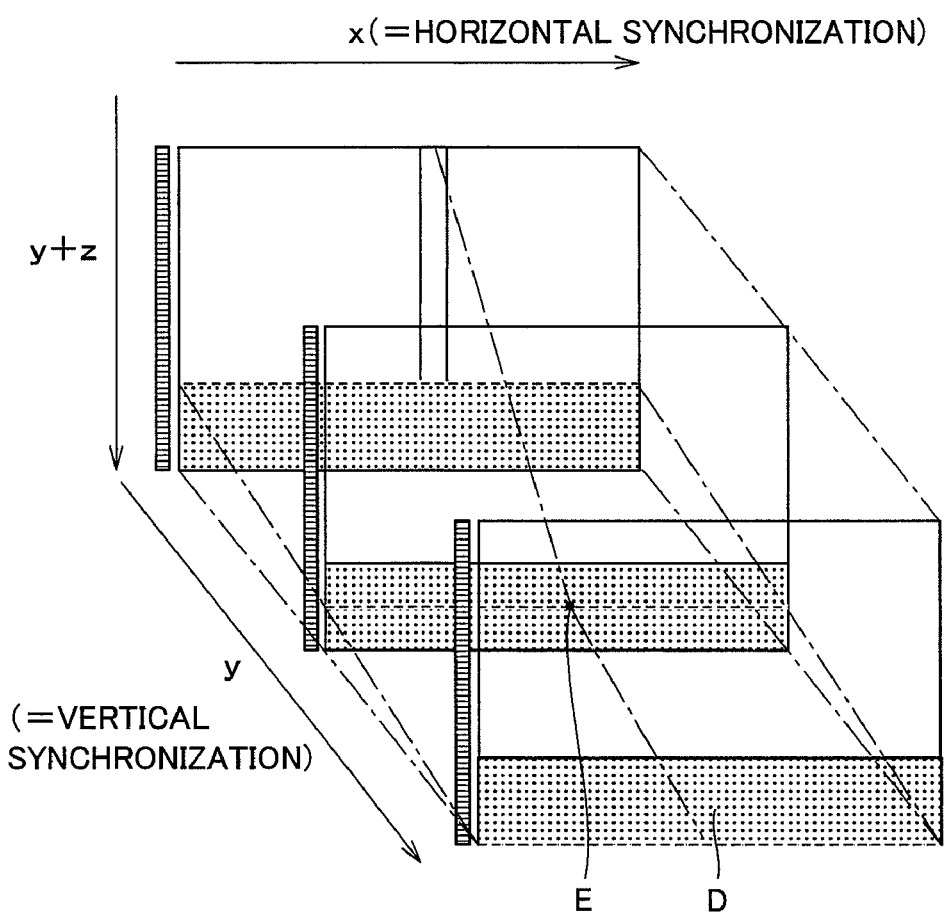
FIG. 10 is a schematic diagram showing a time sequence of the light detected by the one-dimensional CMOS array sensor in a state where the external obstacle touches the reference plane.

FIG. 10 is a schematic diagram showing a time sequence of the light (reflected light B) detected by one-dimensional CMOS array sensor 112 in a state where external obstacle 10 touches the reference plane (surface of table 120). As shown in FIG. 10, in an initial stage (left portion of image 122A in FIG. 9) of the scanning with reflected light B, three-wavelength laser beam A impinges on external obstacle 10, and one-dimensional CMOS array sensor 112 accepts reflected light B at an upper position compared with a case where reflected light B is reflected by the reference plane, that is, table 120. When the scanning behavior reaches a leading end (lower end) of external obstacle 10 as one-dimensional CMOS array sensor 112 sequentially performs the scanning in the y-direction (lower direction in the embodiment), reflected light B is detected at the same position as that of a case where there exists no external obstacle 10. Then one-dimensional CMOS array sensor 112 detects reflected light B while being not affected by external obstacle 10, and reflected light B is sequentially accepted at the same reflection position as that of a case shown in FIGS. 7 and 8.

Thus, CPU 341 can obtain an XY coordinate (horizontal coordinate) on image 122A touched by external obstacle 10 by comparing the detection position of reflected light B and the detection position of the reflected light B in a case where there exists no external obstacle 10.

Figure 11:
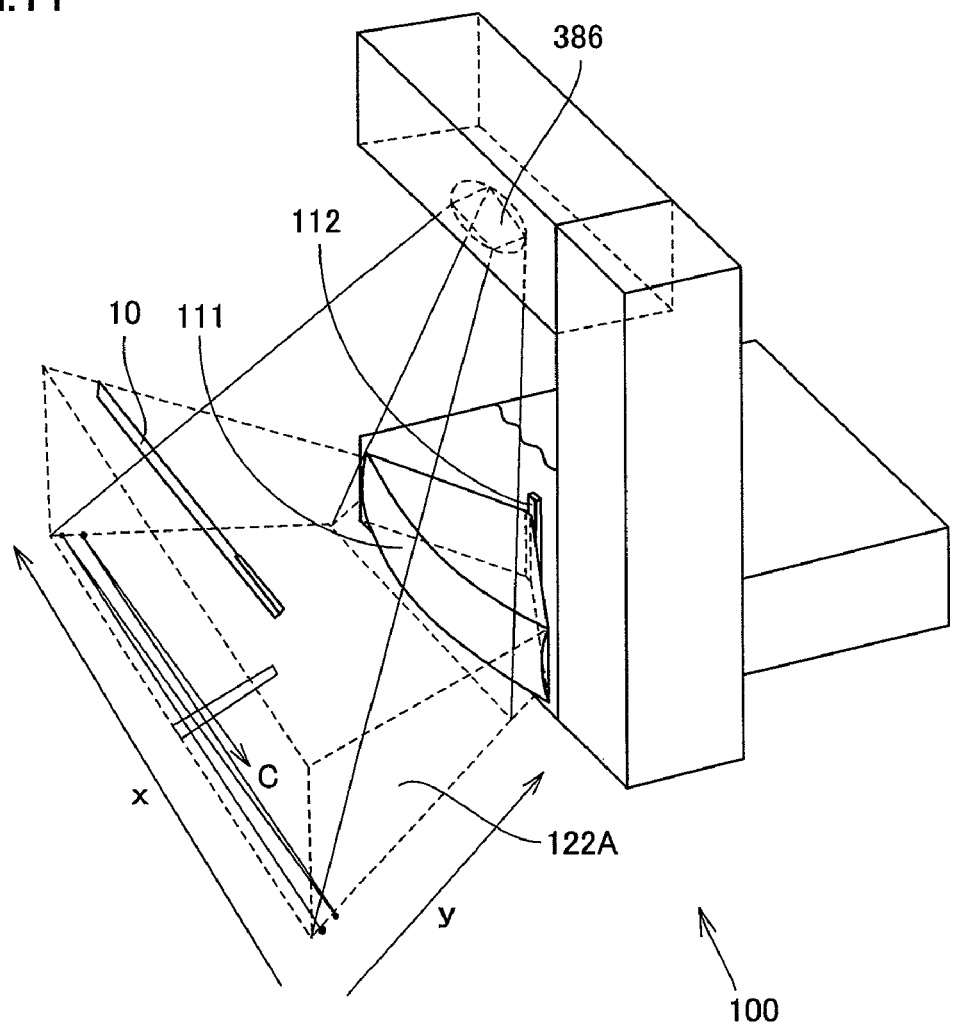
FIG. 11 is a schematic diagram showing the virtual touch panel functioning as the input interface unit in a state where the external obstacle is lifted.

FIG. 11 is a schematic diagram showing the virtual touch panel functioning as the input interface unit in a state where external obstacle 10 is lifted. That is, FIG. 11 shows a state where the user inserts external obstacle 10 (in this case, rod-shape pen) in the optical path of projected three-wavelength laser beam A while external obstacle 10 does not touch the reference plane (table 120), that is, external obstacle 10 is located in air. At this point, FIG. 12 shows the reflected light B accepted by one-dimensional CMOS array sensor 112.

Figure 12:
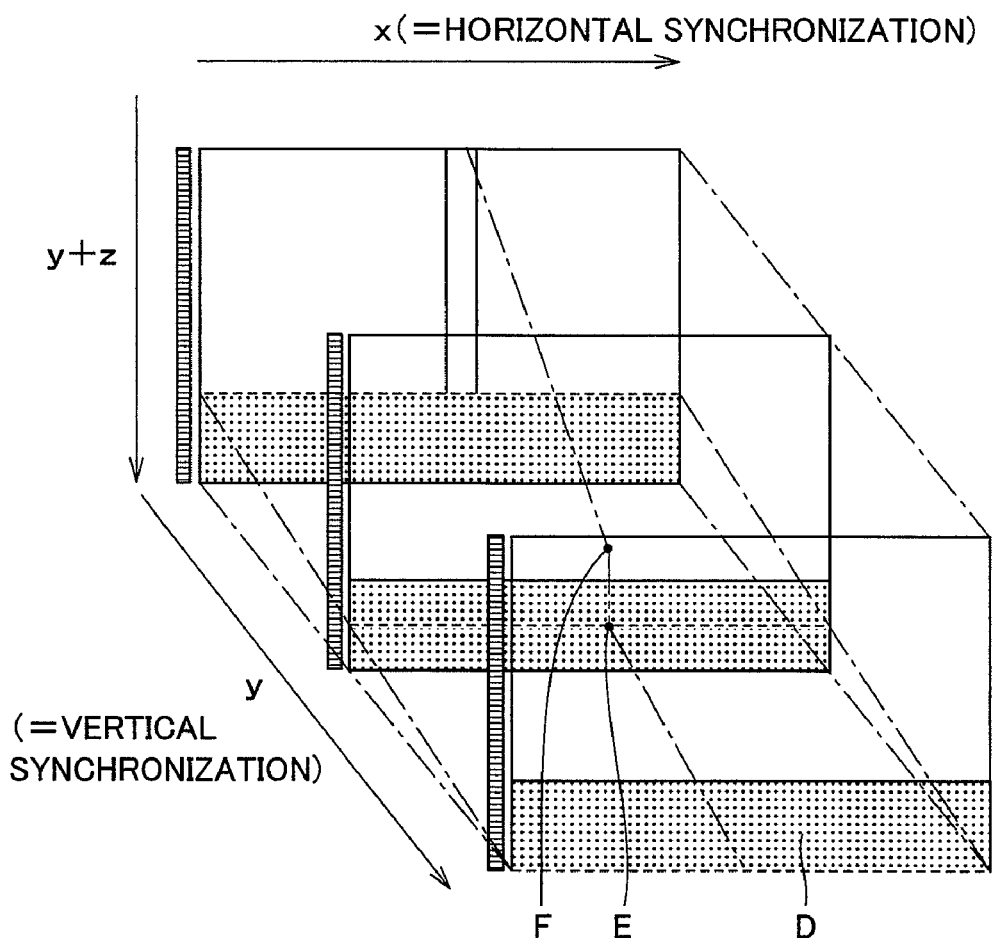
FIG. 12 is a schematic diagram showing a time sequence of the light detected by the one-dimensional CMOS array sensor in the state where the external obstacle is lifted.

FIG. 12 is a schematic diagram showing a time sequence of the light (reflected light B) detected by one-dimensional CMOS array sensor 112 in a state where external obstacle 10 is lifted. Referring to FIG. 12, similarly to FIG. 10, in the initial stage (left portion of image 122A in FIG. 9) of the scanning with reflected light B, three-wavelength laser beam A impinges on external obstacle 10, and one-dimensional CMOS array sensor 112 accepts reflected light B at the upper position compared with a case where reflected light B is reflected by the reference plane, that is, table 120. However, in a case of FIG. 12, because external obstacle 10 is separated upward away from the surface of table 120 on which image 122A is displayed, a difference between the detection position of reflected light B in a case where external obstacle 10 exists and the detection position of reflected light B in a case where there exists no external obstacle 10 is not continuously decreased. That is, while one-dimensional CMOS array sensor 112 detects one-frame reflected light B, reflected light B cannot abruptly be detected after reflected light B reflected by external obstacle 10. Therefore, one-dimensional CMOS array sensor 112 again detects reflected light B reflected from table 120.

That is, after the plural pixels are skipped near a position having a certain y-coordinate, the detection position of reflected light B is matched with the detection position of reflected light B in a case where there exists no obstacle 10. In a case of FIG. 10, the difference is linearly decreased, when the difference (distance between both) between the detection position of reflected light B in a case where obstacle 10 exists and the detection position of reflected light B in a case where there exists no obstacle 10 is sequentially traced. On the other hand, in a case of FIG. 12, the difference is non-linearly changed (or inclination is changed) at a leading-end position of external obstacle 10. Accordingly, when detecting the y-axis coordinate (coordinate in which the difference is non-linearly changed), CPU 341 can recognize that external obstacle 10 does not touch the projection point (surface of table 120) of image 122A.

Thus, while seeing timing of the horizontal synchronizing signal and vertical synchronizing signal for the scanning, CPU 341 compares the image of reflected light B obtained by one-dimensional CMOS array sensor 112 to the image of reflected light B in a case where there exists no external obstacle 10, so that CPU 341 can recognize whether external obstacle 10 exists in the optical path of three-wavelength laser beam A or touches the projection plane (table surface 120).

(Temporal Change Information Obtaining Processing)

Figure 13:
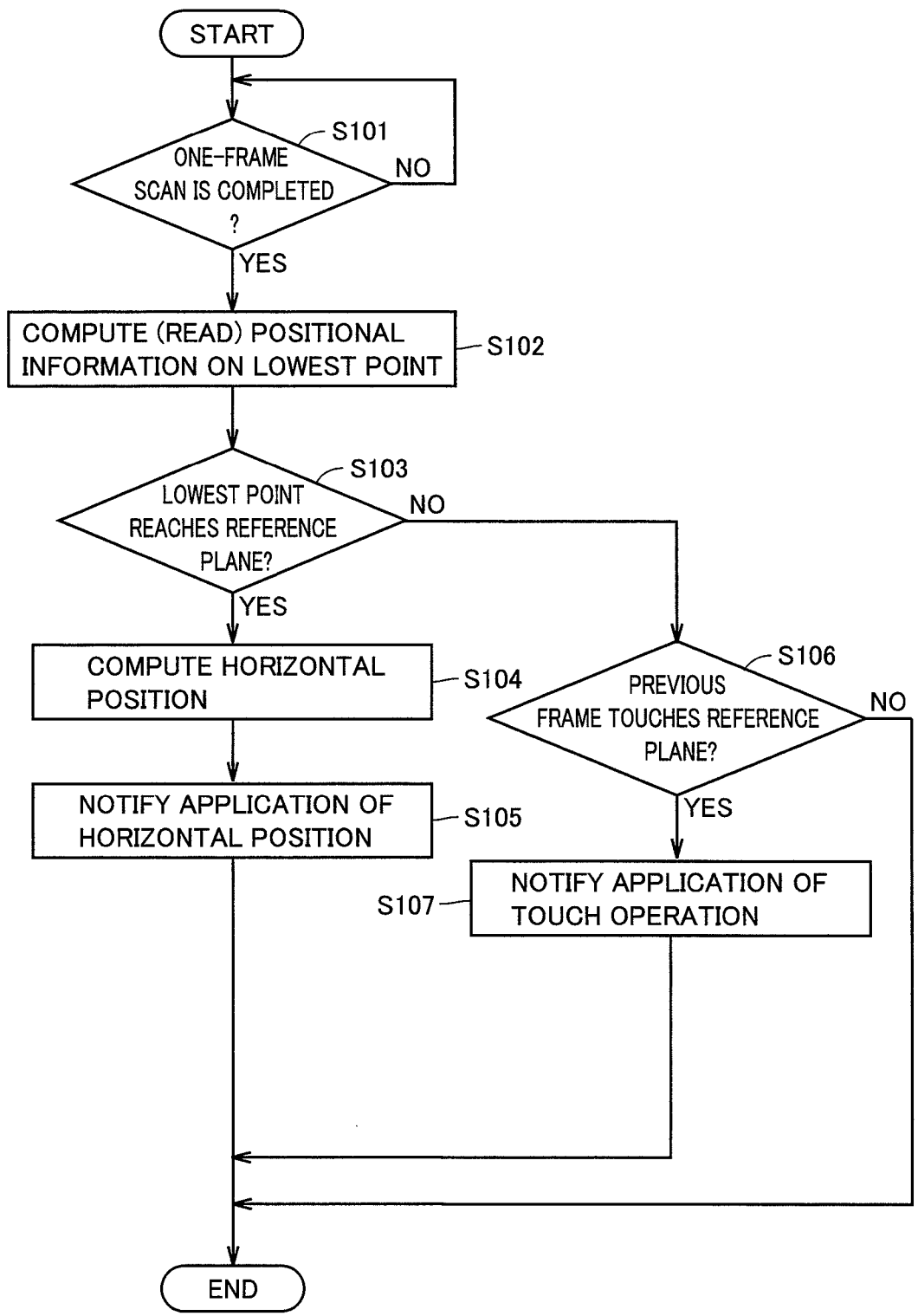
FIG. 13 is a flowchart showing a processing procedure for obtaining change information indicating a change in position of the external obstacle.

FIG. 13 is a flowchart showing a processing procedure for obtaining change information indicating a change in position of external obstacle 10 based on the position of external obstacle 10 recognized in the above-described manner.

CPU 341 always obtains scanning result of reflected light B from CCD sensor 110 (or one-dimensional CMOS array sensor 112) through converter 322. In each time one-frame scanning is ended, that is, in each time the projection of one-frame images 122A and 132A is completed (YES in step S101), CPU 341 computes the positional information (coordinate) on the lowest point of external obstacle 10 (step S102).

CPU 341 determines whether or not the lowest point of external obstacle 10 touches the reference plane (for example, surface of table 120) (step S103). When external obstacle 10 touches the reference plane (YES in step S103), CPU 341 computes the horizontal position of the position where external obstacle 10 touches the reference plane (step S104). CPU 341 delivers the horizontal position to the running application (step S105), and CPU 341 ends the processing for the frame. When external obstacle 10 does not touch the reference plane (NO in step S103), CPU 341 reads information whether or not external obstacle 10 touches the reference plane in performing the scanning of the preceding frame from the storage unit (for example, SDRAM 344), and CPU 341 determines whether or not external obstacle 10 touches the reference plane in performing the scanning of the preceding frame (step S106).

When external obstacle 10 touches the reference plane in performing the scanning of the preceding frame (YES in step S106), CPU 341 determines that the user feeds touch operation into projector 100 through external obstacle 10, and CPU 341 produces touch operation (horizontal position) command to deliver the command to the running application (step S107), and CPU 341 ends the processing for the frame. On the other hand, when external obstacle 10 does not touch the reference plane in performing the scanning of the preceding frame (NO in step S106), CPU 341 ends the processing for the frame.

(Use Mode to Application)

A method in which CPU 341 utilizes the positional information on external obstacle 10 and the change information indicating the change in position in another application will be described below. FIGS. 14A to 17B show specific examples when the laser beam emitted from three-wavelength laser beam generator 350 is split by a prism and the slit supplies the operating image plane (dedicated image 122F) only to operator image plane (122A).

In particular, FIG. 14A is a schematic diagram showing a state where an image plane 132B of an image editing application is projected onto screen 130, and FIG. 14B is a schematic diagram showing a state where an image plane 122B of the image editing application is displayed on table 120. As shown in FIGS. 14A and 14B, image 122B equal to the presentation projection image plane (image 132B) is projected onto the operator-side screen (table 120), and icon (dedicated image 122F) having some functions is displayed below image 122B.

More particularly, FIGS. 14A and 14B shows a state where the user touches the round icon in image 122B (122F) with external obstacle 10. For example, like a position s1 in image 122B, when external obstacle 10 touches image 122B projected to the reference plane (table 120), projector 100 recognizes touch behavior, and the image editing application makes a transition to a marker mode. When the external obstacle 10 traces the screen (image 122B) from a position s2 to a position s3 in image 122B, a particular mark (red circle in this case) is moved from a position corresponding to the position s2 of the operator-side screen to a position corresponding to the position s3 in image 132B projected onto the presentation screen. In the marker mode, a type of a mark can be selected through the icon, which allows a design (shape) of the marker to be changed on the presentation screen.

Figures 15A, 15B:
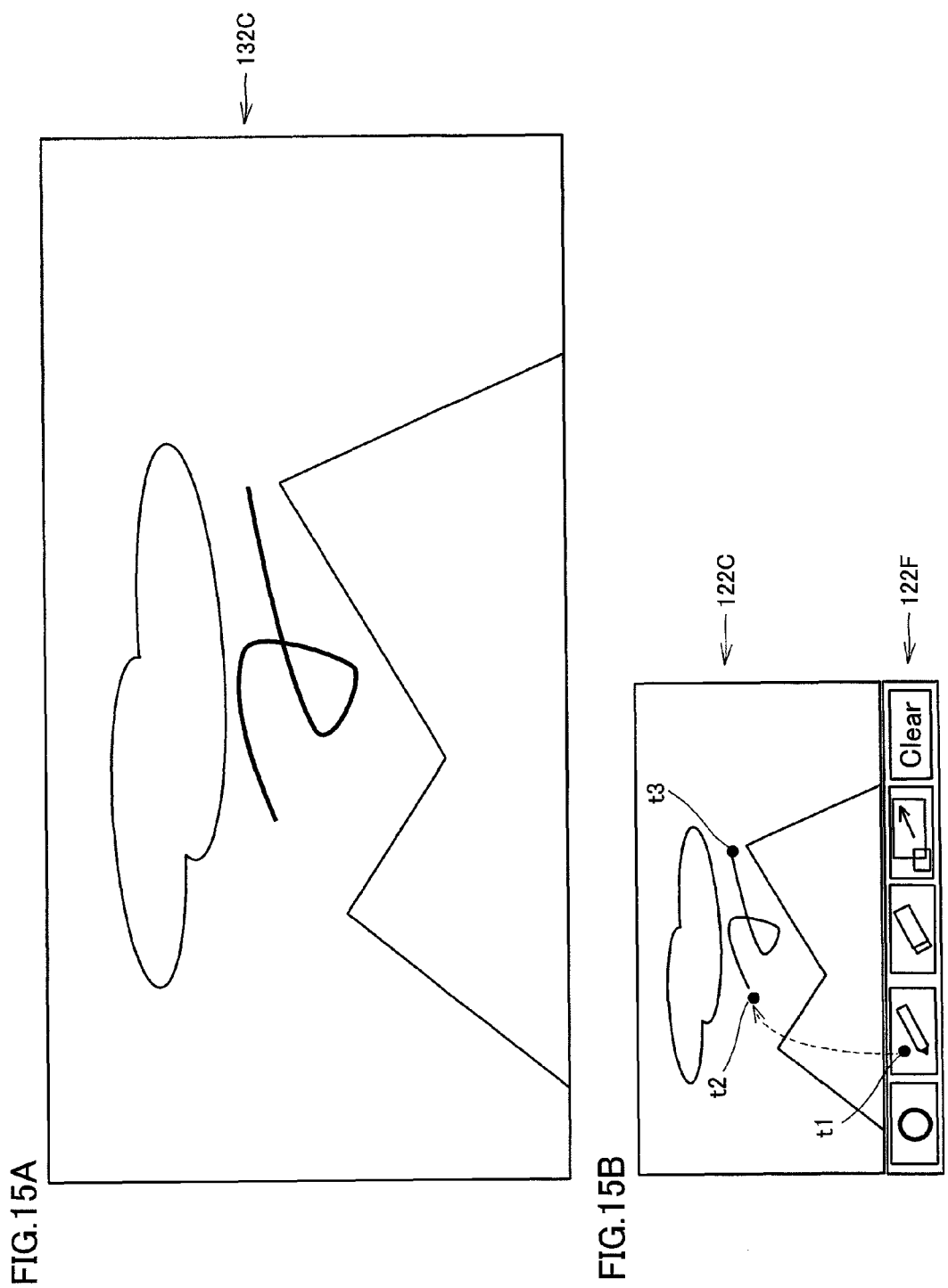
FIG. 15A is a second schematic diagram showing a state where the image plane of the image editing application is projected onto the screen.
FIG. 15B is a second schematic diagram showing a state where the image plane of the image editing application is displayed on the table.

FIG. 15A is a schematic diagram showing a state where an image plane 132C of the image editing application is projected onto the screen 130, and FIG. 15B is a schematic diagram showing a state where an image plane 122C of the image editing application is displayed on table 120. Referring to FIGS. 15A and 15B, like a position t1, the image editing application makes the transition to a marker mode by touching a pen icon portion of image 122C in the surface of table 120 in (122F). Then external obstacle 10 traces table 120 from a position t2 to a position t3 in image 122C, thereby drawing a line drawing in presentation screen 130 (image 132C). In the draw mode, a color and a size of the pen can be selected through the icon, which allows various line drawings to be drawn onto presentation screen 130.

Figure 16A:
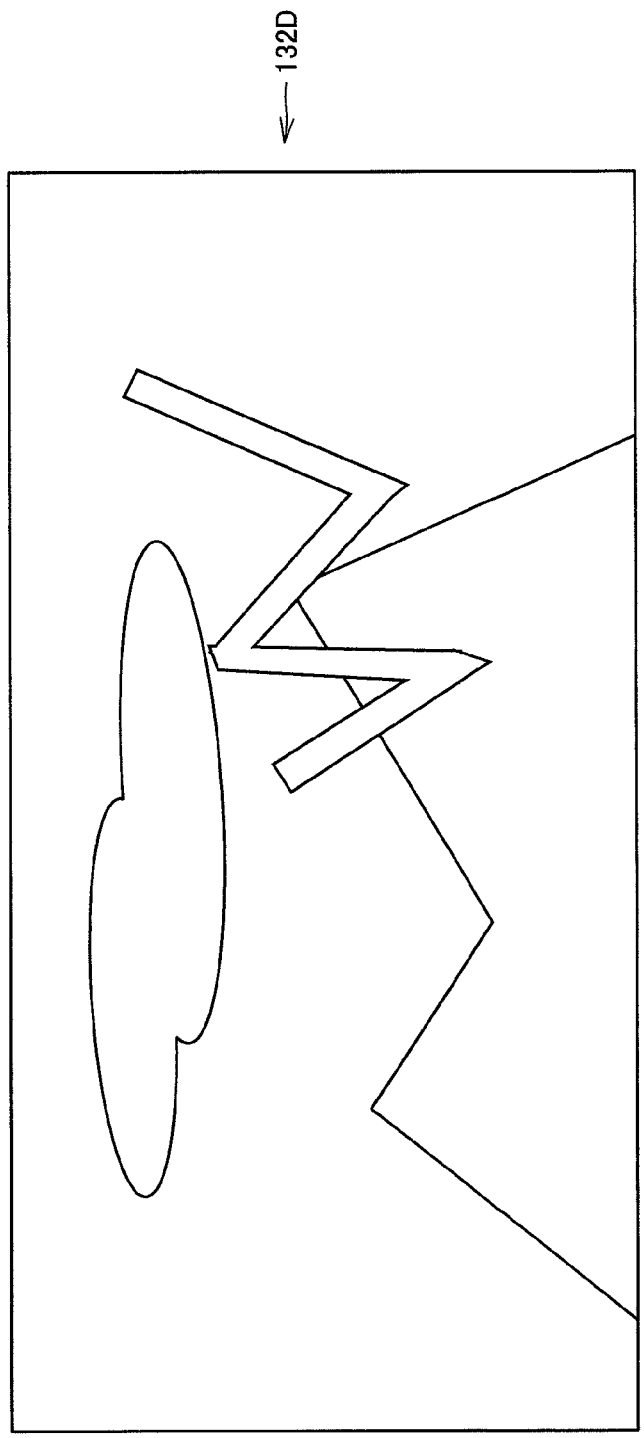
FIG. 16A is a third schematic diagram showing a state where the image plane of the image editing application is projected onto the screen.
Figure 16B:
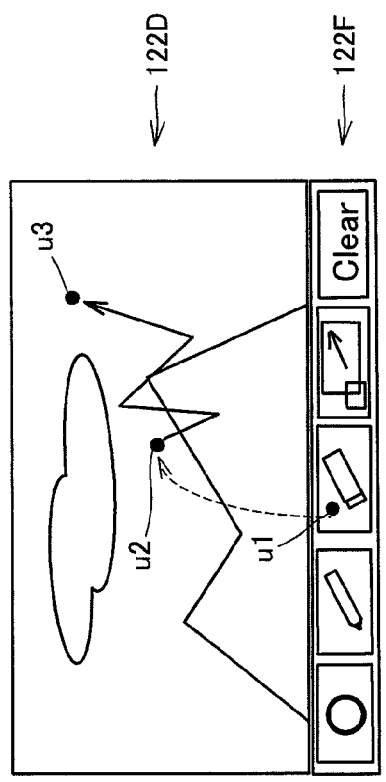
FIG. 16B is a third schematic diagram showing a state where the image plane of the image editing application is displayed on the table.

FIG. 16A is a schematic diagram showing a state where an image plane 132D of the image editing application is projected onto the screen. FIG. 16B is a schematic diagram showing a state where an image plane 122D of the image editing application is displayed on the table. Referring to FIGS. 16A and 16B, external obstacle 10 touches an eraser icon portion of image 122D (112F) in the surface of table 120, whereby the image editing application makes a transition to an erase mode. When external obstacle 10 traces table 120 from a position u2 to a position u3 in operator-side image 122D, the corresponding portion of the image data is erased in image 132D projected onto presentation screen 130. The erase mode may be switched to a mode in which a size of the eraser is changed or a mode in which only the line drawing drawn in the draw mode is erased.

Figure 17A:
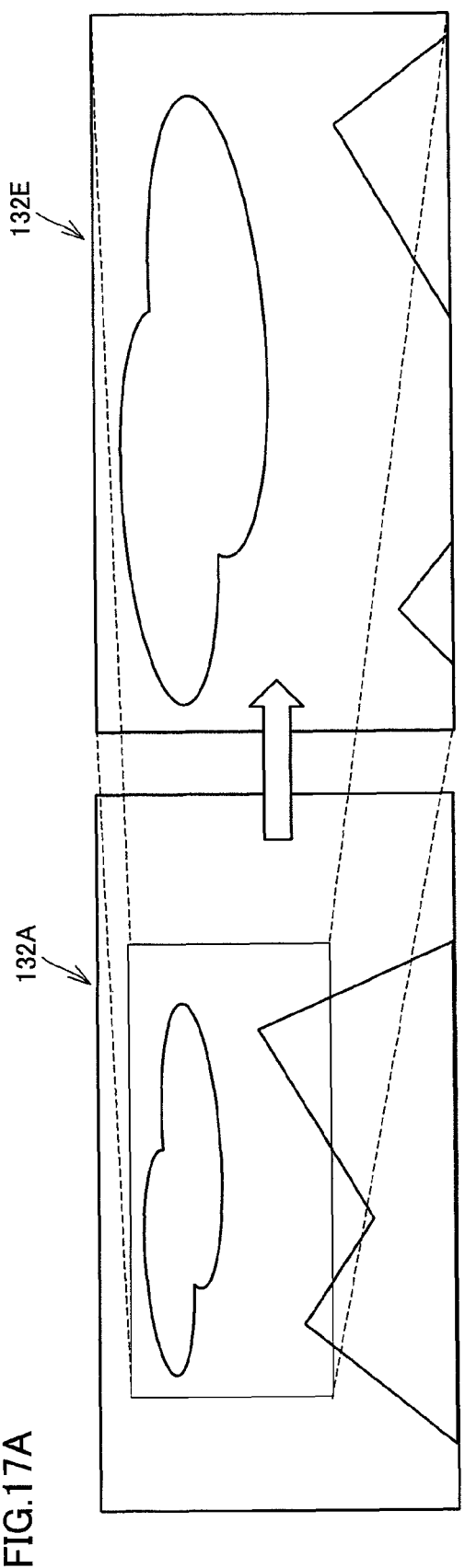
FIG. 17A is a fourth schematic diagram showing a state where the image plane of the image editing application is projected onto the screen.
Figure 17B:
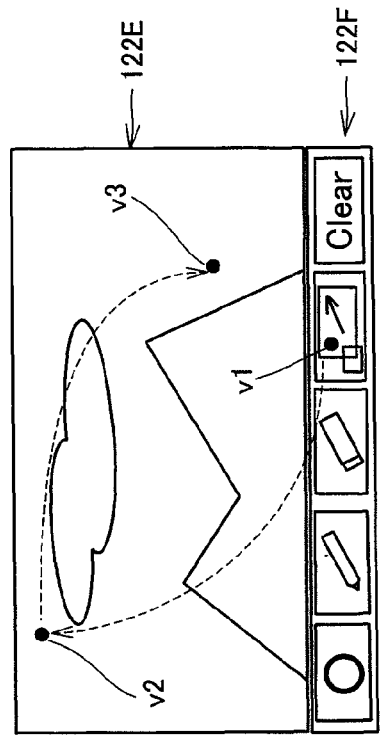
FIG. 17B is a fourth schematic diagram showing a state where the image plane of the image editing application is displayed on the table.

FIG. 17A is a schematic diagram showing a state where an image plane 132E of the image editing application is projected onto the screen. FIG. 17B is a fourth schematic diagram showing a state where an image plane 122E of the image editing application is displayed on the table. Referring to FIGS. 17A and 17B, external obstacle 10 touches a zoom icon portion of image 122E (122F) in the screen surface, specifically external obstacle 10 touches a position v1 in image 122E, whereby the image editing application makes a transition to a zoom mode. When external obstacle 10 sequentially touches a position v2 to a position v3 in image 122E, the image editing application displays a rectangular portion having a diagonal of the two positions v2 and v3 while the rectangular portion is zoomed. That is, zoomed image 132E is projected onto presentation screen 130.

As shown in FIGS. 14A to 17B, the user clicks a "Clear" icon located at a right end in the icon row of dedicated image 122F using external obstacle 10, which allows image 132A to be reset to an original state in presentation screen 130 during the edit.

Thus, the icon image (dedicated image 122F) is included in image 122A projected onto the surface of table 120, so that the projection image plane displayed on presentation screen 130 can be edit with no use of an input interface such as a remote controller using only projector 100.

(Modification)

Figure 18:
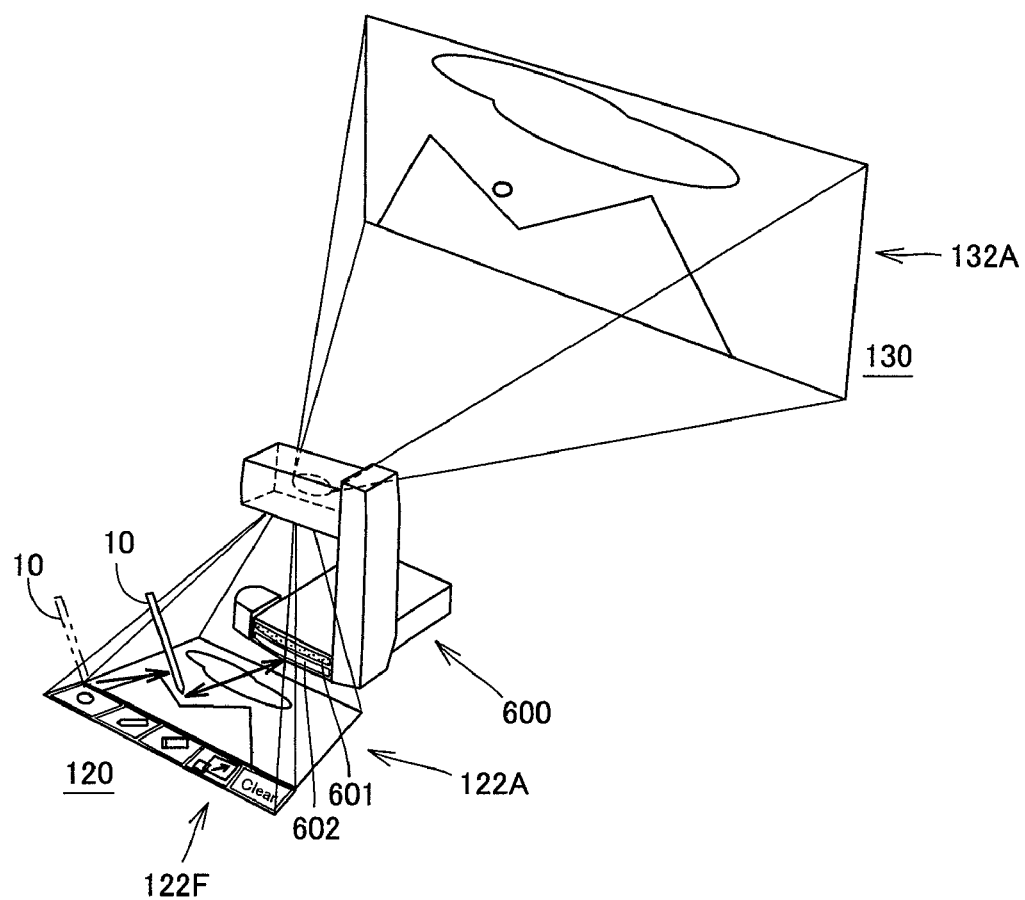
FIG. 18 is a side perspective view showing a laser projector according to a modification of the embodiment of the present invention.

A modification of the embodiment will be described below. FIG. 18 is a perspective view showing a laser projector 600 according to a modification of the embodiment. Referring to FIG. 18, a projector 600 of the modification differs from projector 100 in that the position of external obstacle 10 is specified by an infrared ray instead of three-wavelength laser beam A.

Specifically, projector 600 includes an infrared emission unit 601 and a CCD sensor 602. Similarly to projector 100, projector 600 projects a desired image onto presentation screen 130, and projector 600 also projects the image onto table 120. The user feeds the position to be pointed into projector 600 by disposing external obstacle 10 (such as a finger of the user and a pen held by the user) at the position to be pointed on screen 130.

While the image is projected onto presentation screen 130 and table 120, infrared emission unit 601 of projector 600 emits the infrared ray. The finger or pen of the user is disposed in image 122A of table 120, the finger or pen is illuminated with the infrared ray. CCD sensor 602 accepts the infrared ray reflected by the finger or pen. CPU of projector 600 computes the positional information (coordinate) on external obstacle 10 such as the finger and the pen based on the information obtained from the accepted infrared ray, and a particular mark (pointer) is displayed on presentation screen 130.

Projector 600 may switch the mode by a particular method, for example, by clicking a particular position of the image projected onto presentation screen 130 and table 120 or by transmitting an operation command with a remote controller. In a case where the user feeds characters or an illustration in a virtual manner into image 122A projected onto table 120, the characters or the illustration is displayed in an overlaying manner on presentation image 132A. Projector 600 may store as a multiplexed image in a memory such as a SD card attached to projector 600, and then print and display the image.

Thus, in projectors 100 and 600 of the embodiment, it is not necessary for the user to stand up near screen 130. The user can point a desired position in image 132A on screen 130 through the illustration or mark. As a result, the laser beam can be prevented from mistakenly impinging on the eyes of the user.

In other words, in projectors 100 and 600 of the present embodiment, the user located near the main bodies of projectors 100 and 600 touches the image (image projected in the first direction) projected onto table 120 without utilizing the additional laser pointer or pointing rod, so that the pointer can be displayed at the desired position in the image (image projected in the first direction) projected onto screen 130 or the command can be fed into projectors 100 and 600. Particularly, projector 100 of the embodiment recognizes the position of external obstacle 10 by utilizing laser beam A used to display the image, so that the function of the virtual touch sensor can realized by efficient and simple configuration.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A projector for projecting an image onto a first and a second projection plane, comprising:
    a laser beam generator configured to emit a laser beam according to an image signal;
    a beam splitter configured to split said laser beam into a first laser beam toward said first projection plane and a second laser beam toward said second projection plane;
    a scanning unit, disposed between said laser beam generator and said beam splitter, configured to scan said laser beam from said laser beam generator toward said beam splitter;
    a light receiver configured to receive reflected light of said first laser beam;
    a computation portion configured to compute positional information indicating a position of an obstacle located in an optical path of said first laser beam based on a light receiving result by said light receiver; and
    a display control portion configured to change said image signal so that a pointer is displayed in said image based on said positional information, wherein
    said image includes a first image and a second image,
    said first laser beam projects said first and second images onto said first projection plane, and
    said second laser beam projects said first image onto said second projection plane.

2. The projector according to claim 1, wherein said beam splitter is disposed in a part, corresponding to said first image, of an optical path of said laser beam scanned by said scanning unit.

3. The projector according to claim 1, wherein said image signal includes a vertical synchronizing signal, said light receiver obtains a two-dimensional incident direction of said reflected light, and said computation portion computes said positional information based on said two-dimensional incident direction and said vertical synchronizing signal.

4. The projector according to claim 1, wherein said image signal includes a vertical synchronizing signal and a horizontal synchronizing signal, said light receiver obtains a one-dimensional incident direction of said reflected light, and said computation portion computes said positional information based on said one-dimensional incident direction, said vertical synchronizing signal, and said horizontal synchronizing signal.

5. A projector for projecting an image onto a first and a second projection plane, comprising:
    a laser beam generator configured to emit a laser beam according to an image signal;
    a beam splitter configured to split said laser beam into a first laser beam toward said first projection plane and a second laser beam toward said second projection plane;
    a scanning unit, disposed between said laser beam generator and said beam splitter, configured to scan said laser beam from said laser beam generator toward said beam splitter;
    a light receiver configured to receive reflected light of said first laser beam;

a computation portion configured to compute positional information indicating a position of an obstacle located in an optical path of said first laser beam and compute change information indicating a change in position of the obstacle based on a light receiving result by said light receiver; and a production portion configured to produce an operation command to said projector based on said positional information and said change information, wherein said image includes a first image and a second image, said first laser beam projects said first and second images onto said first projection plane, and said second laser beam projects said first image onto said second projection plane.

6. The projector according to claim 5, wherein said beam splitter is disposed in a part, corresponding to said first image, of an optical path of said laser beam scanned by said scanning unit.

7. The projector according to claim 5, wherein said image signal includes a vertical synchronizing signal, said light receiver obtains a two-dimensional incident direction of said reflected light, and said computation portion computes said positional information based on said two-dimensional incident direction and said vertical synchronizing signal.

8. The projector according to claim 5, wherein said image signal includes a vertical synchronizing signal and a horizontal synchronizing signal, said light receiver obtains a one-dimensional incident direction of said reflected light, and said computation portion computes said positional information based on said one-dimensional incident direction, said vertical synchronizing signal, and said horizontal synchronizing signal.

9. A method for projecting an image onto a first and a second projection plane, comprising:

emitting a laser beam according to an image signal;

scanning said laser beam;

splitting said scanned laser beam into a first laser beam toward said first projection plane and a second laser beam toward said second projection plane;

receiving reflected light of said first laser beam;

computing positional information indicating a position of an obstacle located in an optical path of said first laser beam based on a result of receiving said reflected light;

changing said image signal so that a pointer is displayed in said image based on said positional information, said image including a first image and a second image;

projecting said first and second images onto said first projection plane with said first laser beam; and projecting said first image onto said second projection plane with said second laser beam.

10. The method for projecting an image onto a first and a second projection plane according to claim 9, wherein said splitting includes splitting said scanned laser beam into said first laser beam corresponding to said first and second images and said second laser beam corresponding to said first image.

11. The method for projecting an image onto a first and a second projection plane according to claim 9, wherein said image signal includes a vertical synchronizing signal, said receiving reflected light includes obtaining a two-dimensional incident direction of said reflected light, and said computing positional information includes computing said positional information based on said two-dimensional incident direction and said vertical synchronizing signal.

12. The method for projecting an image onto a first and a second projection plane according to claim 9, wherein said image signal includes a vertical synchronizing signal and a horizontal synchronizing signal, said receiving reflected light includes obtaining a one-dimensional incident direction of said reflected light, and said computing positional information includes computing said positional information based on said one-dimensional incident direction, said vertical synchronizing signal, and said horizontal synchronizing signal.

* * * * *